United States Patent
vanRuymbeke et al.

(10) Patent No.: US 7,973,561 B2
(45) Date of Patent: Jul. 5, 2011

(54) RECEIVER PARTICULARLY FOR A METER-BUS

(75) Inventors: Gilles vanRuymbeke, Menlo Park, CA (US); Andrew Robinson, Los Gatos, CA (US)

(73) Assignee: Echelon Corporation, San Jose, CA (US)

( * ) Notice: Subject to any disclaimer, the term of this patent is extended or adjusted under 35 U.S.C. 154(b) by 1050 days.

(21) Appl. No.: 11/399,051

(22) Filed: Apr. 5, 2006

(65) Prior Publication Data
US 2007/0239318 A1    Oct. 11, 2007

(51) Int. Cl.
*H03K 19/0175* (2006.01)
(52) U.S. Cl. ............ 326/82; 326/81; 330/296; 330/297; 330/306
(58) Field of Classification Search .................... 455/33, 455/34, 418, 557; 379/56–58, 61, 63, 89; 607/27–28, 30, 32, 37, 8–9; 326/26, 30, 326/81–83, 86–87; 327/94, 95, 96, 538, 327/539, 108, 109, 333; 330/290–307
See application file for complete search history.

(56) References Cited

U.S. PATENT DOCUMENTS

| | | | | |
|---|---|---|---|---|
| 4,266,177 A | * | 5/1981 | Nola | 318/810 |
| 4,737,975 A | * | 4/1988 | Shafer | 455/418 |
| 4,878,017 A | * | 10/1989 | Williams | 324/109 |
| 5,431,692 A | * | 7/1995 | Hansen et al. | 607/28 |
| 5,815,020 A | * | 9/1998 | Allen et al. | 327/255 |
| 6,178,514 B1 | * | 1/2001 | Wood | 713/300 |

OTHER PUBLICATIONS

European Standard, EN 13757-2, Communication systems for and remote reading of meters—Part 2: Physical and link layer; Nov. 2004, European Committee for Standardization.
European Standard, EN 13757-3, Communication systems for and remote reading of meters—Part 3: Dedicated application layer; Nov. 2004, European Committee for Standardization.

* cited by examiner

*Primary Examiner* — James H. Cho
*Assistant Examiner* — Christopher Lo
(74) *Attorney, Agent, or Firm* — Blakely, Sokoloff, Taylor & Zafman LLP

(57) ABSTRACT

A receiver particularly suited for an M-BUS is described. During transmission, the receiver is disabled. After each transmission, nodes and states in the receiver are set to prepare the receiver to receive a signal. Once data is sensed, a feedback loop clips the input signal to the receiver to limit the swing of the input signal. The line of the power supply at the lower potential is modulated, rather than modulating the line at the higher potential, for the transmission of data.

6 Claims, 5 Drawing Sheets

RECEIVER PARTICULARLY FOR A METER-BUS

FIELD OF THE INVENTION

The invention relates to the field of receivers for use with signals having a large dynamic range of amplitudes and time.

PRIOR ART AND RELATED ART

A standardized serial bus system for the remote reading of meters and various sensors, has been adopted in Europe. The so-called meter-bus or M-BUS permits, for instance, a power meter to act as a master/gateway for other household meters such as gas and water meters. The M-BUS interconnects the master (e.g. power meter) with the slaves (e.g. gas and water meters). Other sensors such as temperature sensors and actuators to, for example, shed electrical loads, may also be coupled to the M-BUS. The physical and link layer of the M-BUS is set forth in EN13757-2 and the application layer in EN13757-3.

The implementation of physical layer presents several challenges especially in the design of a fault tolerant power supply and a receiver. These are discussed in connection with FIGS. 1 and 2.

SUMMARY OF THE INVENTION

A receiver is disclosed for operating with a bus such as an M-BUS. The receiver senses current changes on the same bus on which a power supply potential is modulated to transmit data. The receiver includes a bias feedback loop which causes the input signal to be clipped once it has been sensed.

DETAILED DESCRIPTION

A receiver particularly suited for M-BUS is described. In the following description, numerous specific details are set forth. It will be appreciated that these details are used to provide a thorough understanding of the present invention, and other circuit configuration and values may be used within the scope of the present invention.

Figure 1:
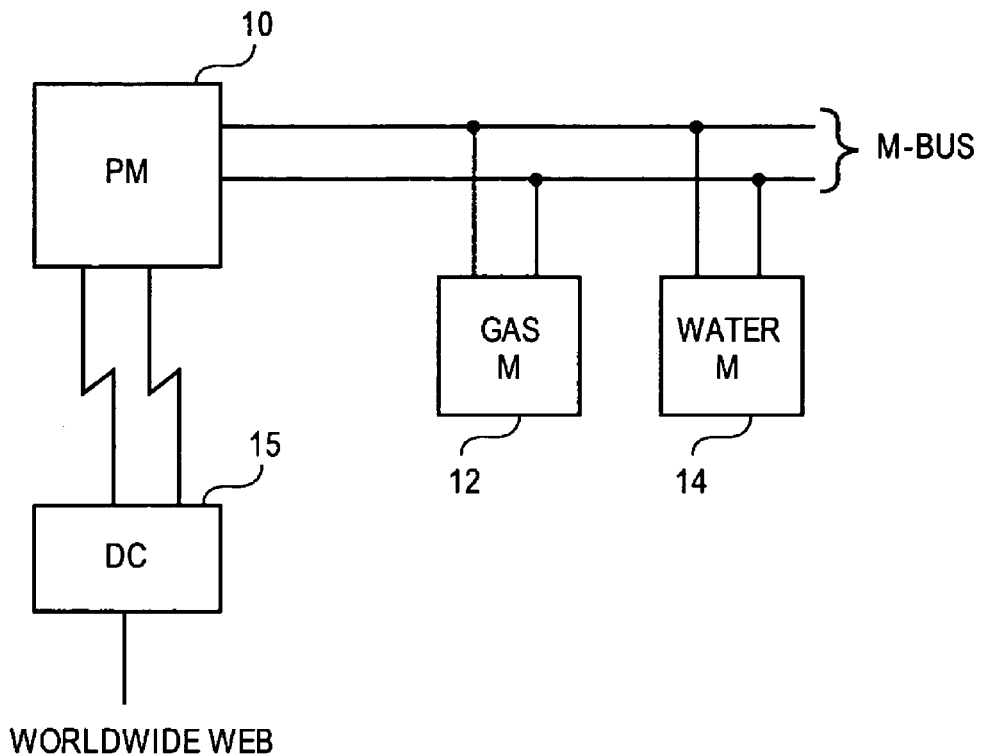
FIG. 1 is an overall block diagram of an M-BUS and a power meter's gateway connection.

FIG. 1 illustrates a typical arrangement in which the M-BUS is used. A power meter 10, which is a master under the M-BUS standard, communicates with several slaves such as a gas meter 12 and a water meter 14. The power meter 10, for instance, may poll the gas and water meters to obtain readings over the M-BUS. Several power meters 10 may be coupled to a data concentrator 15 over an RF or IR link, or a hard-wired link. Data concentrators, then may communicate with a central station over, for example, the Internet. Alternatively, the power meter 10 may communicate directly over the Internet with a central station. The meter 10 may communicate not only its own readings but those of the other meters on the M-BUS, and may receive instructions which are communicated to the slaves on the M-BUS. In this manner, the power meter 10 acts as a gateway.

Figure 2:
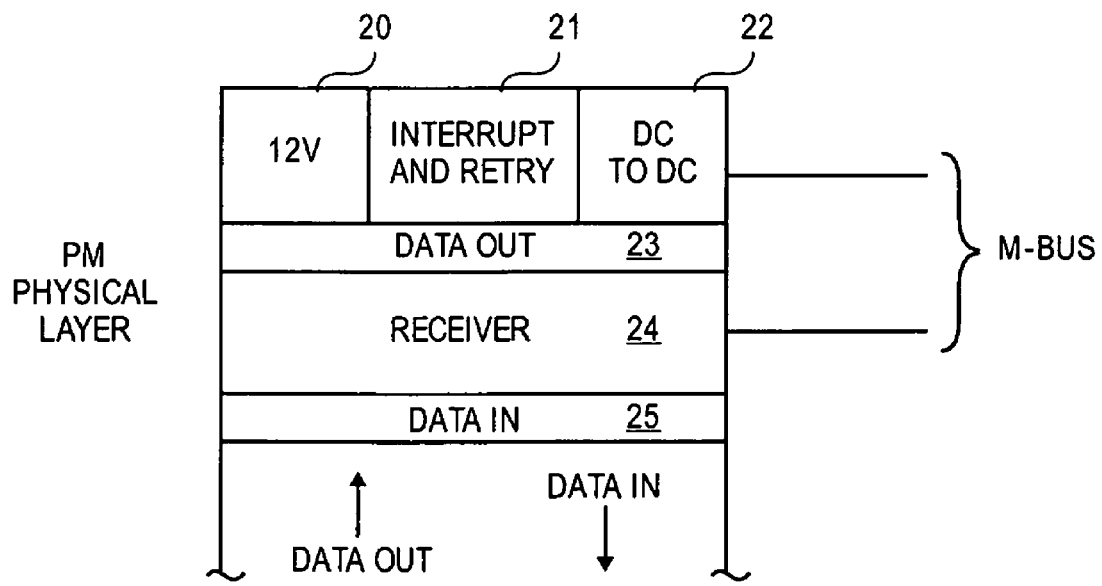
FIG. 2 is a general block diagram showing the physical layer in the power meter for the M-BUS.

Referring to FIG. 2, the physical layer portion of the power meter is shown in block diagram form. The M-BUS may be ordinary conductors such as a twisted pair. In the M-BUS standard, one line is at +36 V with respect to the other line. Power for the slaves is drawn from the M-BUS. Data is transmitted from the master to the slaves by modulating the voltage on the power line from 36 volts to 24 volts. A logical "1" (referred to as a "mark") is represented by the condition of the lines being at 36 volts. A logical "0" (referred to as a "space") is represented by the reduction of the lines to 24 volts. For an embodiment of the present invention, the ground line is changed by 12 volts (0 for "space" or 12V for "mark") to signal a space, while the other power line remains at 24 volts.

Information is sent from the slaves to the master by modulating the current consumed by the transmitting slave. When no slave is sending a space, a constant current is drawn from the master corresponding to the total quiescent current of all the slaves. A logical "1" or mark transmitted by a slave is represented by a constant current of up to 1.5 mA. A logical "0" or space is represented by the flow of an additional 11-20 mA. As currently implemented, the M-BUS standard utilizes only half duplex transmissions on the bus, and consequently, transmission is either from master-to-slave or slave-to-master, but not both at the same time.

In FIG. 2, the physical layer of the M-BUS is implemented with a 12 volt power supply 20, an interrupt and retry circuit 21 and a DC-to-DC converter 22. The 12 volt supply is stepped up to 24 volts for one line of the bus. The other line of the bus is modulated between 0 and 12 volts for the transmission of data from the master. These voltages are different from those specified in the standard, but it will be appreciated that the circuits described in this application are applicable to the specific voltages described in the standard, and that the selection of a particular voltage is somewhat arbitrary. The data transmitted from the power meter of FIG. 2 is represented by the block 23, adjacent the power supply, to indicate that one line of the power supply is modulated to provide the mark and space for the master-slave direction.

The M-BUS standard requires that each of the slaves have a current limiting resistor at its input of approximately 430 ohms. This limits the current in the event of a short within a slave, to a maximum of 100 mA. A challenge in the receiver design is to sense data from one slave while another is experiencing a short. The receiver must be able to discern the mark and space both in the presence of a low current flow (no short) and a high current flow (slave experiences short). These modulation extremes span two orders of magnitude. Moreover, communications can take place at baud rates from 300-9600 Baud.

Figure 3:
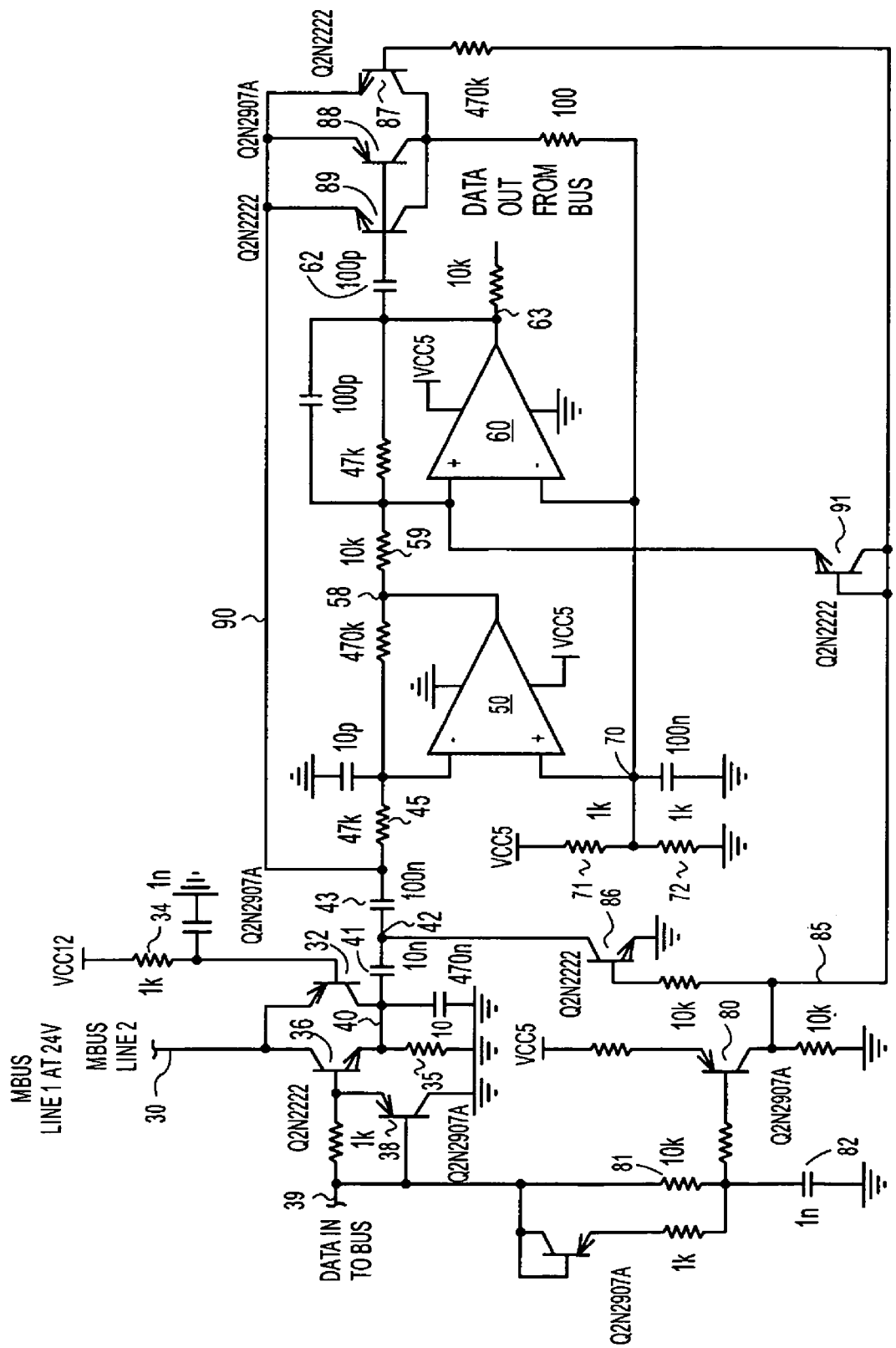
FIG. 3 is a schematic drawing of a receiver particularly suited for an M-BUS or other application.

The circuit of FIG. 3 includes the transmitter circuit, although most of the components of FIG. 3 are used for receiving. The transmit data is coupled to the line 39 where it is connected to the base of an npn transistor 36 through a resistor. The emitter of this transistor is connected to ground through a shunt resistor 35. The collector of transistor 36, as well as the emitter of a pnp transistor 32, are connected to a line 30, one line (line 2) of the bus. For the described embodiment, line 2 of the bus varies between 0-12 volts as data is transmitted. Line 1 of the bus remains at a constant 24 volts. The base of transistor 32 is coupled to a source of 12 volts through the resistor 34 to clamp the M-BUS in one of its states to 12 volts plus a diode junction drop.

Figure 6:
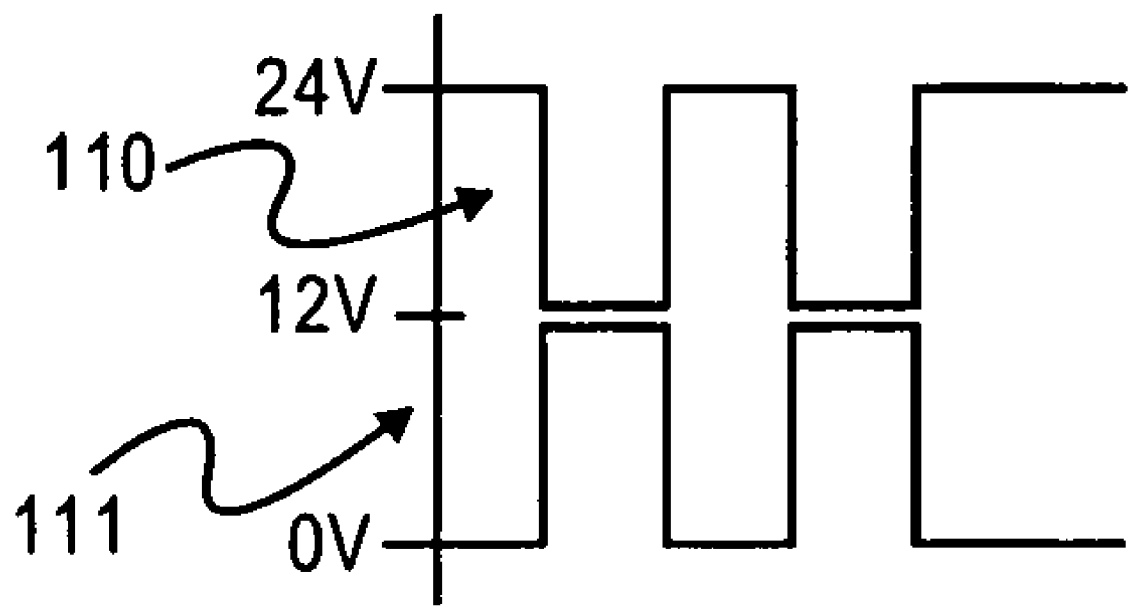
FIG. 6 illustrates the waveform from the modulated power supply for M-BUS and for an embodiment of the present invention.

The modulation of the lower potential of the power supply in M-BUS enables a more cost effective design since level shifting is not required to modulate the 24 volts. Referring briefly to FIG. 6, the waveform 110 illustrates the modulated power supply as set forth in the M-BUS specification. The modulation from 24 volts to a lower voltage is not easily dealt with when the circuitry operates at a lower potential, for instance, 0-5 volts. On the other hand, as shown by waveform 111, when one line of the power supply (the line at the higher potential) is kept constant, for instance at 24 volts, and the other line is modulated between 0-12 volts, the modulated signal is adaptable for circuits operating with a power supply of, for example, 5 volts with respect to the 0 volts.

When the potential on line 39 is low, transistor 36 does not conduct and bus line 2 remains at 12 volts because transistor 32 is operating as a diode to 12 volts with the current flowing through the shunt resistor 35. When the potential on line 39 is high, transistor 36 conducts and bus line 2 is brought close to ground potential (i.e. 1 volt) through the transistor 36 and resistor 35. The transistor 32 acts as a diode to the 12 volt supply with current flowing through resistor 35 to minimize current swings during transmissions. The pnp transistor 38, coupled to the base of transistor 36, assures that transistor 36 has a fast shut-off time by removing base charges.

The receiver of FIG. 3 has a signal path for amplifying the signal represented by the current changes sensed on line 2 of the bus. This represents the data being sent in the case of the M-BUS from, for instance, the meters 12 and 14 of FIG. 1 to the power meter 10. When data is being received, the transistor 36 is conducting and the changes in current in the bus are sensed by the shunt resistor 35. These changes in current are converted to a voltage, representing the received input data, at node 40. Node 40 is connected to the input of the operational amplifier 50 through the series capacitors 41 and 42 and the resistor 45. The capacitors 41 and 43 remove the DC component from the signal on node 40.

As will be described in more detail later, the capacitors 41 and 43 may be looked at as a single capacitor. In conjunction with the transistor 86, the capacitors 41 and 43 operate as an analog switch which is open for the signal when node 42 is connected to ground, and closed when the node 42 floats. Moreover, as will be discussed, the voltage swing on the capacitors is limited by transistor 88 and 89.

The operational amplifier 50 amplifies the signal with a negative gain and provides an output at node 58. The positive input terminal to the amplifier 50 is biased at approximately +2.5 volts from the line 70. The line 70 is maintained at 2.5 volts by the voltage divider comprising the resistors 71 and 72. The amplifier 50 has a gain of minus 10.

The output of the amplifier 50 (node 58) is coupled to an analog flip-flop realized with a comparator (operational amplifier 60) with positive feedback. Data-out (node 63) represents the received data.

When data is being transmitted, the rise and fall of the potential on node 40 caused by transistor 36 cycling on and off, greatly disrupts the biasing points and the charges on the nodes in the receiver. It is necessary to effectively disable the receiver when data is being transmitted, and to override the bias points on transmission so that the receiver can be reset to a state needed to sense the first received bit. To this end, a gating circuit is used to trigger these events.

The transistor 80 provides gating to control various functions in the receiver, as will be described, as data is transmitted. When the potential on line 39 drops, indicating that data is being transmitted, transistor 80 conducts. The RC time constant associated with the resistor 81 and capacitor 82 provide delay on the rising edge of the signal on the base of transistor 80 and hastens the turning on of transistor 80 when the signal falls. Thus, when data is being transmitted, transistor 80 turns on more quickly than it turns off when a data bit ends. The resultant signal on line 85 effectively disables the receiver. Moreover, this signal controls three functions within the receiver that enable it to tolerate the relatively large voltage swings associated with the transmission of data and to prepare the receiver to receive data.

The signal on line 85 cause transistor 86 to conduct. This in turn clamps node 42 substantially to ground and substantially prevents signal transfer from the node 42 to the capacitor 43.

The signal on line 85 also causes the transistor 91 to conduct. This conduction resets the flip-flop 60. The operational amplifier 60 because of the positive feedback as mentioned, essentially operates as a bistable circuit or a flip-flop and needs resetting to be in the proper polarity for the first transition (start bit) of the received signal.

Finally, the gating signal on line 85 causes the transistor 87 to conduct, thereby connecting the biasing potential on line 70 (2.5 volts) to node 90. This provides the necessary biasing at capacitor 43 for receipt of the first received bit.

Thus, to summarize, the gating signal on line 85 opens the analog switch, mentioned earlier, formed by capacitors 41 and 43 by grounding the common node between them. Secondly, the signal on line 85 resets the flip-flop 60. And lastly, the gating signal on line 85 through the transistor 87, provides biasing for the capacitor 43.

The transistors 88 and 89 perform an important function when data is being sensed by the receiver. To understand the function, it first must be appreciated that the receiver operates over a wide baud rate. To enable this, particularly at the lower baud rate, the capacitors 41 and 43 are relatively large. At the higher baud rate, the transistors 88 and 89 are used to clip the signal level to limit the signal that would otherwise pass through these capacitors at the higher frequency.

When the flip-flop 60 changes state, indicating that data has been sensed, the input signal to the amplifier 50 can be effectively shut off. The change of state at line 63 is coupled through the capacitor 62 to the bases of the transistors 88 and 89. These transistors conduct for a short time allowing the bias to be reset at the input to the amplifier 50 since sensing is no longer needed for the current bit.

Figure 4:
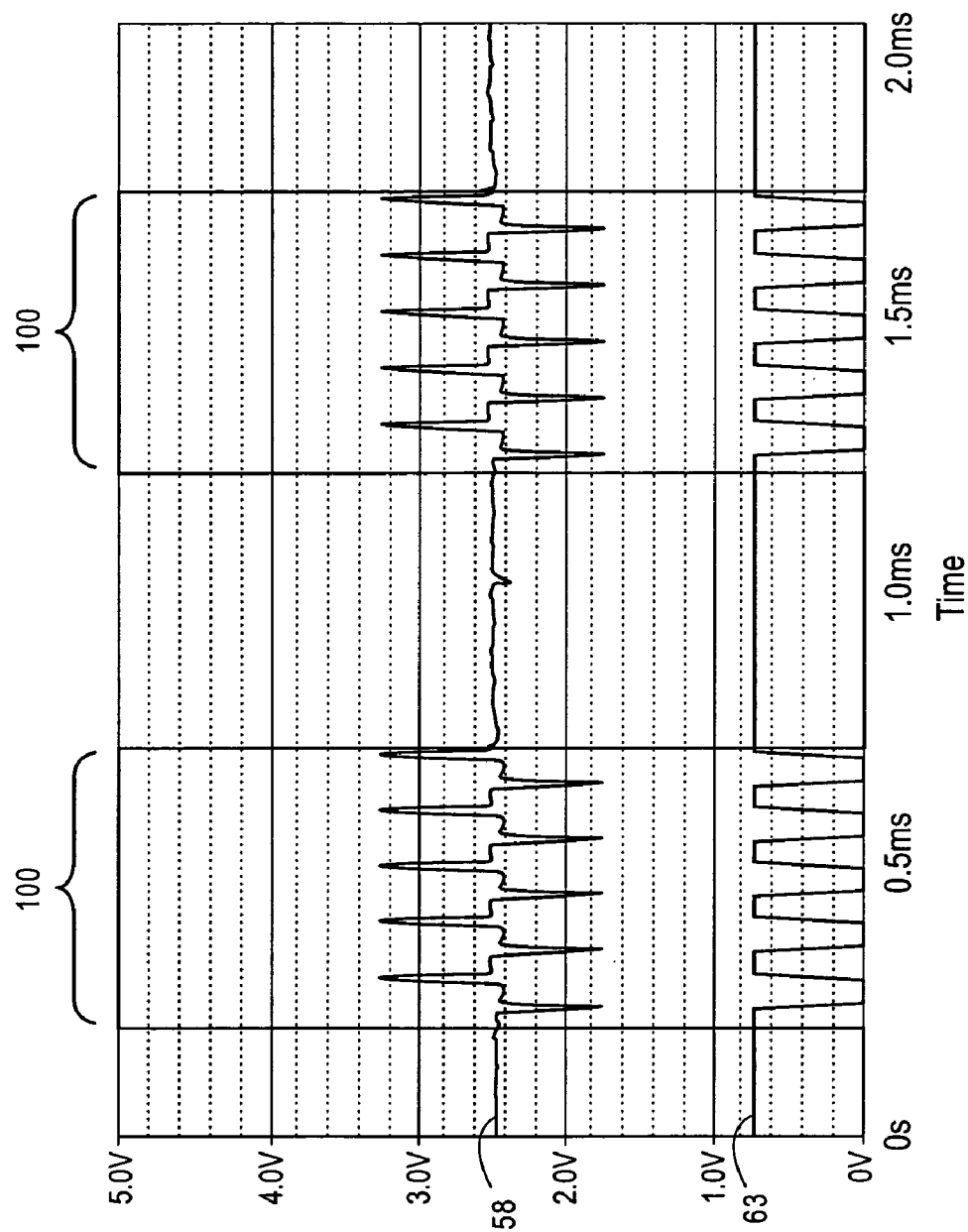
FIG. 4 illustrates several waveforms associated with the transmission of data over the M-BUS.

In FIG. 4, waveforms are shown to demonstrate what is occurring in the receiver when data is transmitted. During the times 100 in FIG. 4, data is being transmitted from device to host onto the bus line 2 of FIG. 3. The signal on nodes 58 and 63 during this time is shown.

Node 58, which is the amplified signal on node 90, quickly rises and falls with each data bit transmitted. The falling and rising (return from peak to bias point) is caused by the clipping performed by the transistors 88 and 89.

The second waveform in FIG. 4 is the potential on the output node 63 of the flip-flop 60. As can be seen, there is a 50% duty cycle, that is, no time distortion.

Figure 5:
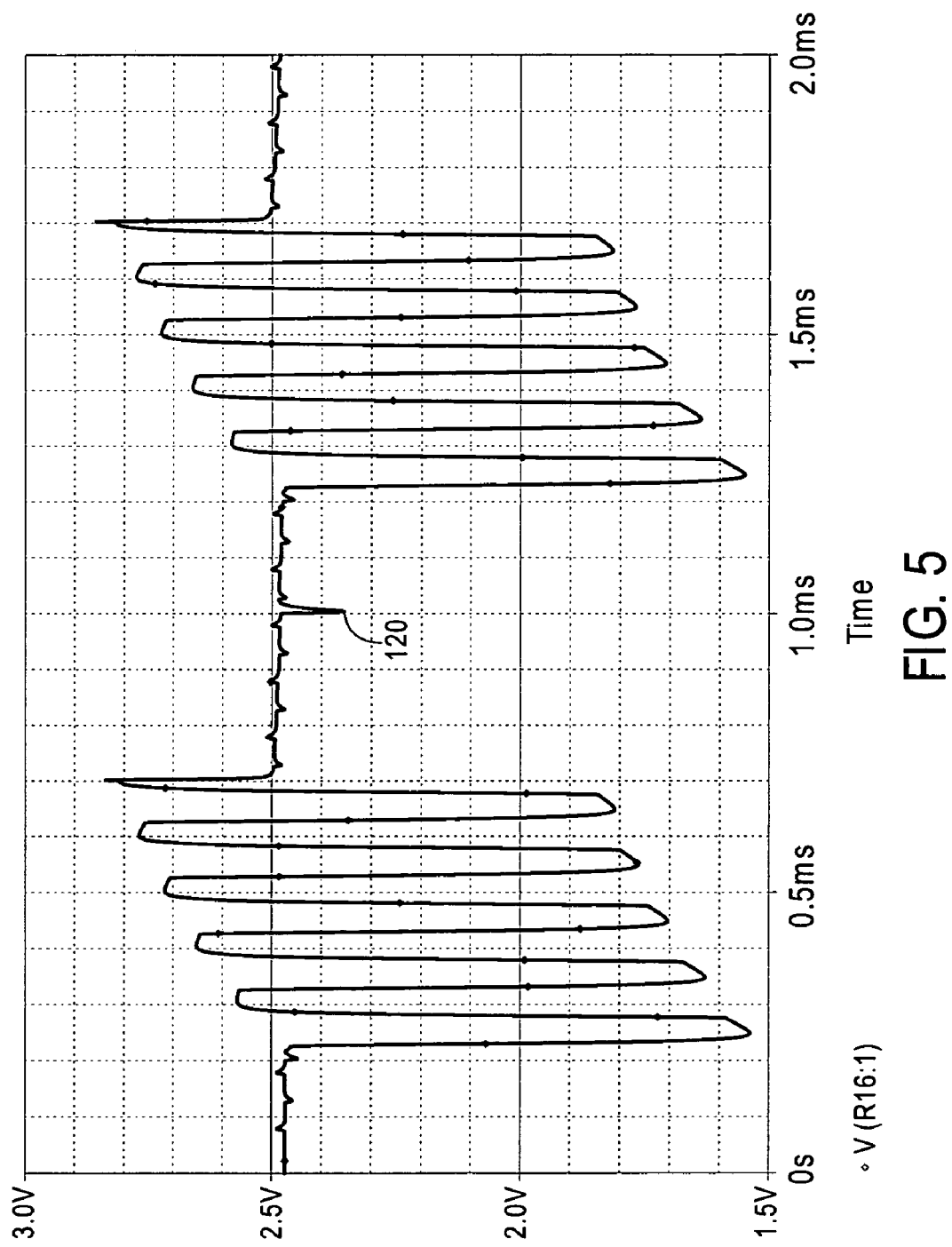
FIG. 5 illustrates a waveform of FIG. 4 without one of the circuits provided in FIG. 3.

In FIG. 5, the corresponding waveform to that shown on line 58 of FIG. 4 is again shown. This time however, without the operation of transistors 88 and 89 (capacitor 62 missing). As can be seen, the potential on the node 58 is not reset to the approximately 2.5 volts between each of the data bits. This wandering waveform prevents the data from being sensed at the output of the flip-flop 60.

The spike 120 during the transmit period and the corresponding spike in FIG. 4 demonstrate the signal on node 58 when a short occurs on the M-BUS during the transmission of data. Note the quick recovery to the 2.5 volt level after the short.

Thus, a receiver, particularly suited for an M-BUS has been disclosed.

The bias feedback principle can be extended to other applications such as for telecommunications where a wide range of amplitudes and/or a wide range of bandwidths (speed) are required.

What is claimed is:

1. A receiver for sensing current changes on a bus where data is transmitted on the bus by modulating a voltage on the bus, comprising:

first means coupled to the bus for converting the current changes on the bus to an input signal;

second means for amplifying the input signal coupled to the first means;

a pair of capacitors each having a first and second terminal, coupled in series between the first means and second mean the first terminal of one of the capacitors coupled to received the input signal from the first means and the second terminal of the other capacitor coupled to provide the input signal to the second means; and a gating circuit activated by transmissions on the bus, for disabling the receiver during transmissions by grounding a node between the pair of capacitors comprising the second terminal of the one capacitor and the first terminal of the other capacitor, and for reestablishing bias points in the receiver following a transmission.

2. The receiver defined by claim 1, wherein the gating circuit includes means for establishing a predetermined polarity after a transmission on a bistable circuit coupled to an output of the second means.

3. The method defined by claim 2, wherein the gating circuit includes means for establishing a predetermined bias at the second capacitor following a transmission.

4. A method for operating a receiver which senses current changes on a bus, where data is transmitted on the bus by modulating a power supply potential on the bus, comprising:

sensing the current changes on the bus;

converting the current changes to an input signal;

capacitively coupling the input signal to an amplifier through a pair of series connected capacitors each having a first and second terminal, the first terminal of one capacitor receiving the input signal and the second terminal of the second capacitor coupling the input signal to the amplifier;

determining when data is being transmitted;

coupling a node between the capacitors comprising the second terminal of one of the capacitors and the first terminal of the other capacitor to ground thereby disabling the receiver when it is determined that data is being transmitted; and rebiasing the amplifier following the transmission of data.

5. A receiver for operating with a pair of lines which connect the receiver to slave units where power for the slave units is provided over the pair of lines, and where data is transmitted to the slave units by changing a power potential between the pair of lines, and also where data is transmitted from the slave units to the receiver by changing the amount of current drawn by the one of the slave units transmitting data to the receiver, comprising:

a first resistive circuit connected to one of the pair of lines for providing an input signal to the receiver in response to a change in current on the line;

a capacitive circuit comprising a first and second capacitors coupled in series, the first capacitor being coupled to the first resistive circuit for removing a DC component from the input signal;

an amplifier having an input coupled to the second capacitor;

a bistable circuit coupled to an output of the amplifier;

a sensing circuit for sensing the transmission of data to at least one of the slave units, coupled to at least one of the pair of lines;

a clamping circuit coupled to the capacitor circuit and the sensing circuit, for grounding a node between the first and second capacitors thereby substantially preventing the amplifier from sensing the transmission of data; and a biasing circuit for biasing the input to the amplifier in response to the sensing of data being transmitted, coupled to the amplifier and the sensing circuit.

6. The receiver of claim 5, including a reset circuit for resetting the state of the bistable circuit in response to the sensing of the transmission of data.

\* \* \* \* \*